W. C. BROOKS.
CONTAINING BOX FOR ELECTRIC BATTERIES.
APPLICATION FILED SEPT. 14, 1916.
1,381,399.
Patented June 14, 1921.
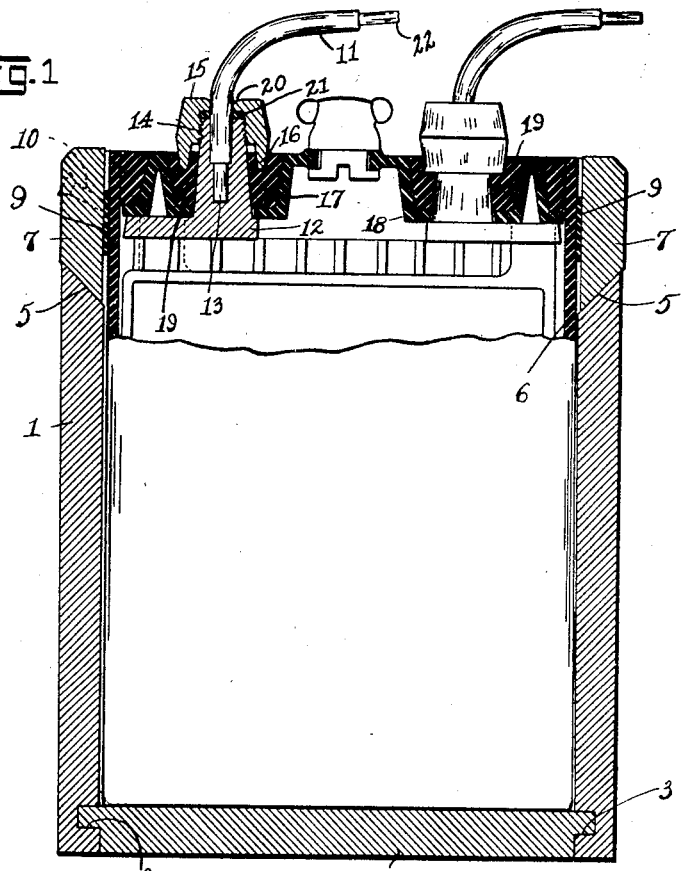
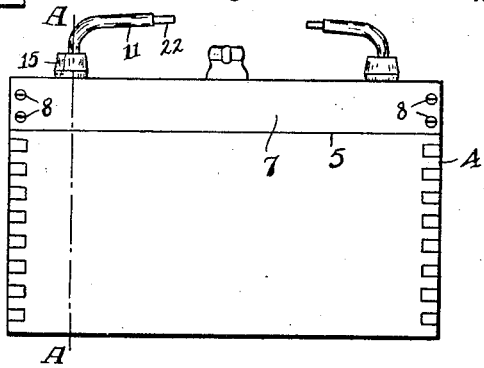
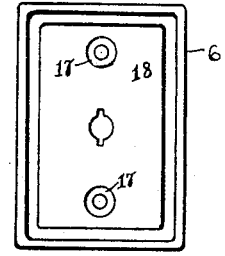
INVENTOR.
WILLIAM C. BROOKS
BY Ira J. Adams.
ATTORNEY

UNITED STATES PATENT OFFICE.

WILLIAM C. BROOKS, OF LAKEWOOD, OHIO, ASSIGNOR, BY MESNE ASSIGNMENTS, TO NATIONAL CARBON COMPANY, INC., A CORPORATION OF NEW YORK.

CONTAINING-BOX FOR ELECTRIC BATTERIES.

1,381,399.  Specification of Letters Patent.  Patented June 14, 1921.

Application filed September 14, 1916. Serial No. 120,013.

*To all whom it may concern:*

Be it known that I, WILLIAM C. BROOKS, a citizen of the United States, residing at Lakewood, in the county of Cuyahoga and State of Ohio, have invented a certain new and useful Improvement in Containing-Boxes for Electric Batteries, of which the following is a full, clear, and exact description.

This invention relates to storage batteries and one of the objects is to secure a battery box with readily operated means for clamping the battery jars in position therein.

Referring to the drawings:

Figure 1 is a partial sectional elevation taken on the line A—A of Fig. 2 but on a larger scale.

Fig. 2 is a side view of the battery.

Fig. 3 is a plan view of a jar and cover with all other parts removed.

The battery box consists of sides 1 secured to a bottom 2 by suitable means such as glued joints 3 and to the ends 4 by a lock joint construction below the line 5 (Fig. 2). In order to clamp the rubber jars 6 tightly in the battery box, strips 7 on each side are adapted to be clamped to the ends 4 by means of suitable screws 8. To make a tight and elastic fit, the insides of the strips 7 are preferably lined with a packing 9 of some material such as soft rubber. This may partially or entirely cover the inside surface of the strips 7, as desired.

In order to prevent the middle part of the strips 7 from buckling outward, it is preferable to bevel the sides 1 of the box at the strips 7, to fit together as shown at 5 in Fig. 1. To permit the beveled surfaces to coöperate further in the clamping arrangement, the screws 8 may be given a downward slant, as shown at 10 in dotted lines in Fig. 1.

The battery box, constructed in the way described, permits the ready insertion of the cells therein, as no asphaltum or other sealing compound is used between the jars and the box. All that is necessary to fix the cells in position is to tighten screws 8 which clamps the separable or adjustable sections or slats 7 and the packing 9 on the inner side thereof against the upper outside of the battery jar. Conversely, the cells can be readily removed by loosening the screws, so that the construction permits of a saving of time at the factory, as well as at the service station whenever the batteries are repaired.

It is not absolutely essential to use two adjusting strips, as one would suffice by giving it sufficient adjustability. However, two strips are preferable.

A further feature is the improved form of battery terminal. It is customary to make battery terminals of heavy lead construction with a suitable hole for inserting a lead terminal secured to a flexible cable. I avoid all these heavy connections by casting a flexible insulated copper cable 11 directly in the electrode post 12. The lower part of the cable is bared of insulation as at 13, but a portion of the insulation extends into the battery post.

To give the connection a neater appearance and also to prevent acid from attacking the cable, I form threads 14 on the lead post 12 and screw thereon a nut 15 of hard rubber or other suitable material. The nut 15 has a depending skirt 16 extending downward into the cavity 17 in the battery cover 18 which is filled with molten pitch or asphaltum compound 19 after the nuts 15 have been placed in position and the cell is assembled in the battery box. The nut 15 has the inner portion chamfered at 20 to permit the cable 11 to bend properly without subjecting the copper strands to severe strain.

To prevent the electrolyte from reaching the cable in the post it is preferable to pour hot pitch or asphaltum compound 21 on top of the post immediately before the nut 15 is screwed into position, so that there will be a layer of sealing compound around the cable where it enters the post.

This construction of terminal is cheap to make and has unusually high conductivity. It is also easy to attach to the desired translating device, as all that is necessary is to connect the other end 22 of the cable to a suitable cable clamp or binding post, as the case may be.

Having described my invention, what I claim is:—

1. A battery cell box having one or more sides thereof formed of relatively adjustable sections, the lower sections being rigidly secured together to form the box proper, and the upper section or sections being adjustable inwardly relatively to the lower section or sections and comprising inwardly projecting means adapted to engage the upper outside of a cell in said box, and means for adjusting such upper section or sections and projecting means inwardly to clamp a cell in said box.

2. In a storage battery box, a pair of side members having upper edges beveled downwardly and inwardly, end members secured to said side members and projecting above said beveled edges, clamping slats having bottom edges beveled to substantially fit and coöperate with said first mentioned beveled edges, a band of elastic material on the inner surfaces of said slats, and means for adjustably clamping said slats against the projecting portions of said end members to clamp storage cells in the battery box.

3. A storage battery cell box having one or more sides thereof formed of sections, the lower sections being rigidly secured together and the upper section or sections being adjustable inwardly relatively to the lower sections, packing means on the inner sides of such upper section or sections, and means for securing such upper section or sections to the box proper and also for clamping such upper section or sections and such packing means against a cell in said box to retain such cell therein.

In testimony whereof, I hereunto affix my signature.

WILLIAM C. BROOKS.